United States Patent [19]

Hedtmann-Rein et al.

[11] Patent Number: 5,171,825
[45] Date of Patent: Dec. 15, 1992

[54] PREPARATION OF POLYPHENYLENE ETHERS

[75] Inventors: Carola Hedtmann-Rein; Bernhard Czauderna, both of Hirschberg; Martina von Deessen, Speyer; Karl Hennig, Hessheim, all of Fed. Rep. of Germany

[73] Assignee: BASF Aktiengesellschaft, Ludwigshafen, Fed. Rep. of Germany

[21] Appl. No.: 695,385

[22] Filed: May 3, 1991

[30] Foreign Application Priority Data

May 16, 1990 [DE] Fed. Rep. of Germany ....... 4015653

[51] Int. Cl.$^5$ .................... C08G 65/44; C08G 65/40
[52] U.S. Cl. .................................... 528/214; 528/215; 528/217
[58] Field of Search ............... 528/214, 215, 217

[56] References Cited

U.S. PATENT DOCUMENTS

| | | | |
|---|---|---|---|
| 3,306,874 | 2/1967 | Hay | 528/215 |
| 3,306,875 | 2/1967 | Hay | 528/215 |
| 3,384,619 | 5/1968 | Hori et al. | 428/215 |
| 3,432,466 | 3/1969 | Hay | 526/71 |
| 3,549,670 | 12/1970 | Spousta | 552/304 |
| 3,639,656 | 2/1972 | Bennett et al. | 528/215 |
| 3,642,699 | 2/1972 | Cooper et al. | 528/215 |
| 3,661,848 | 5/1972 | Cooper et al. | 528/215 |
| 3,733,299 | 5/1973 | Cooper et al. | 528/215 |
| 4,130,504 | 12/1978 | Rutledge | 502/168 |
| 4,503,214 | 3/1985 | White et al. | 528/212 |

FOREIGN PATENT DOCUMENTS

| | | |
|---|---|---|
| 232701 | 8/1987 | European Pat. Off. . |
| 263590 | 4/1988 | European Pat. Off. . |
| 3600610 | 7/1987 | Fed. Rep. of Germany . |
| 3600611 | 7/1987 | Fed. Rep. of Germany . |
| 1574937 | 7/1969 | France . |

OTHER PUBLICATIONS

Kirk-Othmer Encyclopedia of Chemical Technology, Second ed., vol. 19, pp. 512-515, 1969.

*Primary Examiner*—Nathan M. Nutter
*Assistant Examiner*—Jeffrey Culpepper Mullis
*Attorney, Agent, or Firm*—Oblon, Spivak, McClelland, Maier & Neustadt

[57] ABSTRACT

A process for preparing polyphenylene ethers from monohydric phenols which have alkyl substituents in both ortho positions and possibly also in one meta position but not in the para position, by oxidative coupling with oxygen-containing gases in the presence of an oxidation catalyst and of an electrically conducting compound which counteracts the electrostatic charge in the reaction mixture, in organic solution, comprises using as electrically conducting compound a salt of a carboxamide derivative of the formula I

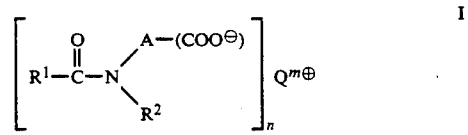

or mixtures of such salts, where
$R^1$ is a saturated or singly or multiply unsaturated aliphatic group which can have a terminal phenyl group and which contains a total of 8-30 carbon atoms, it also being possible for these carbon atoms to be interrupted by isolated oxygen atoms,
$R^2$ is hydrogen or $C_1$-$C_4$-alkyl,
A is an aliphatic, araliphatic or cycloaliphatic or aromatic bridge of up to 10 carbon atoms,
n and m are each 1 to 3,
$Q^\oplus$ is ammonium, an alkali metal cation or the equivalent of an alkaline earth metal cation or a cation of a metal of groups IVb to VIIb of the periodic table.

7 Claims, No Drawings

PREPARATION OF POLYPHENYLENE ETHERS

The present invention relates to an improved process for preparing polyphenylene ethers from monohydric phenols which have alkyl substituents in both ortho positions and possibly also in one meta position but not in the para position, by oxidative coupling with oxygen-containing gases in the presence of an oxidation catalyst and of an electrically conducting compound which counteracts the electrostatic charge in the reaction mixture, in organic solution.

Polyphenylene ethers and processes for the preparation thereof, are disclosed in U.S. Pat. Nos. 3,306,874, 3,306,875 and 3,432,466. Modifications of the process for preparing these, polymers are described in U.S. Pat. Nos. 3,384,619, 3,639,656, 3,642,699, 3,661,848 and 3,733,299.

The processes used for preparing polyphenylene ethers are mainly based on self-condensation of a monohydric phenol in the presence of an oxygen-containing gas and of a catalyst.

Passing oxygen/nitrogen mixtures through the reaction mixture causes safety problems because an explosive mixture of gases is produced in the solution In particular, the increase in viscosity of the solution during the course of the reaction is unavoidably associated with an increase in the electrostatic charge, which may lead to explosion of the gas mixture above a certain limiting electrical resistance.

DE-A 3 600 611 and DE-A 3 600 610 disclose antistatics for ethylene polymerization.

As is known, polyethylene is prepared under high pressures and at elevated temperatures, the reaction being carried out with gaseous monomer and solid catalysts in a suitable reactor. The process conditions are therefore not comparable with a liquid/gas reaction under atmospheric pressure and at room temperature for the preparation of polyphenylene ethers. In addition, the antistatic remains in the polyethylene, whereas in the synthesis of polyphenylene ethers it is desirable to remove this additive completely after the polymerization.

It is an object of the present invention to provide an electrically conducting compound for the preparation of polyphenylene ethers which, in small amounts, counteracts electrostatic charging of the reaction solution and can be removed without difficulty during the processing of the polymer solution.

We have found that this object is achieved by a process for preparing polyphenylene ethers from monohydric phenols which have alkyl substituents in both ortho positions and possibly also in one meta position but not in the para position, by oxidative coupling with oxygen-containing gases in the presence of an oxidation catalyst and of an electrically conducting compound which counteracts the electrostatic charge in the reaction mixture, in organic solution, which comprises using as electrically conducting compound a salt of a carboxamide derivative of the formula I

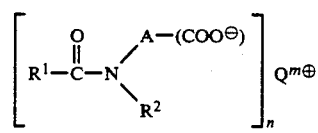

or mixtures of such salts, where $R^1$ is a saturated or singly or multiply unsaturated aliphatic group which can have a terminal phenyl group and which contains a total of 8-30 carbon atoms, it also being possible for these carbon atoms to be interrupted by isolated oxygen atoms, $R^2$ is hydrogen or $C_1$-$C_4$-alkyl A is an aliphatic, araliphatic or cycloaliphatic or aromatic bridge of up to 10 carbon atoms, n and m are each 1 to 3, $Q^\oplus$ is ammonium, an alkali metal cation or the equivalent of an alkaline earth metal cation or a cation of a metal of groups IVb to VIIb of the periodic table.

$R^1$ can be straight-chain or branched, unsaturated or saturated alkyl containing a total of 8-30, preferably 10-24. and, in particular, 12-20carbon atoms and possibly, to increase the solubility in the reaction mixture, a terminal phenyl group. Examples of $R^1$ are alkyl chains of saturated fatty acids.

Particularly suitable for R are the alkyl radicals of unsaturated fatty acids such as oleic, linoleic, linolenic and eleostearic acids, because compounds I with these radicals have particularly high solubility in the reaction mixture.

Other suitable radicals for R: are those derived from hydroxy carboxylic acids as R COOH, whose hydroxyl groups have been alkoxylated, for example with ethylene oxide or 1,2-propylene oxide. The preferred degree of alkoxylation is from 4 to 8.

Suitable for $R^2$ are hydrogen and $C_1$-$C_4$-alkyl, with hydrogen and methyl being particularly preferred.

Preferred for A are aliphatic and aromatic bridges with up to 10, preferably up to 8, carbon atoms, the particularly preferred bridges being phenyl, methylene, ethylene or propylene.

n is an integer from 1 to 3, with 1 being preferred, but 2 or 3 carboxyl groups are also possible when A is phenylene.

$Q^\oplus$ is ammonium, an alkali metal cation or the equivalent of an alkaline earth metal cation or a cation of a metal of groups IVb to VIIb of the periodic table. Preferred metal cations are sodium, calcium and chromium(III), and potassium, magnesium and manganese (III).

Preferred compounds of the formula I are chromium-(III) tris(oleoyl-N-methylglycinate), calcium di(oleoyl-lanthranilate) and sodium oleoyl-N-methyl-glycinate, which can be employed alone or mixed together in any ratio. However, an equimolar mixture of these salts is preferred.

The compounds of the formula I are present in amounts of from $1.10^{-4}$ to 0.1, preferably from $3.10^{-4}$ to 0.035 and, in particular, from $3\ 10^{-4}$ to $7.10^{-3}\%$ of the total weight of the reaction mixture.

The electrically conducting compound I is preferably employed in solution. Suitable and preferred solvents are liquid paraffins, especially $C_9$-$C_{11}$-paraffins.

The concentration of the electrically conducting compound I in the solvent is preferably from 25 to 40 % by weight, in particular from 30 to 35 % by weight. It is possible, if required to improve metering, to employ n-heptane or another lower hydrocarbon mixed with paraffins of this type.

In addition, it has proven particularly expedient to add, for stabilization, sterically hindered phenols such as 2,4-di-tert-butylphenol to the paraffin solution of the compound I. The concentration thereof in the solution is normally up to 40, preferably up to 33, % by weight.

The monohydric phenols used for preparing the polyphenylene ethers and having alkyl substituents in both ortho positions and possibly also in one meta position but not in the para position are customary phenols such as 2,6-dimethylphenol, 2,6-diethylphenol, 2-methyl-6-ethylphenol, 2-methyl-6-propylphenol, 2,6-dibutylphenol, 2,3,6-trimethylphenol and mixtures of these phenols.

2,6-Dimethylphenol is preferred, and the methods used for removing phenols which interfere with the polymerization, such as phenol, o-, p- and m-cresol and multinuclear phenols such as 2,6-dimethyl-1-hydroxybiphenyl, are those described in the literature (cf. Houben-Weyl-Muller, Methoden der organischen Chemie, Phenole, Part 2, Volume 6/1 C, Georg Thieme Verlag, Stuttgart, 1976, pages 1187 et seq. and literature cited therein).

The polycondensation is normally carried out by passing oxygen-containing gases or oxygen into the solution of the monomer, which is at from 10 to 60, preferably 15 to 50° C, in the presence of a catalyst complex. The oxygen flow rate is essentially the same as described in US Patents 3 306 874 and 3 306 875.

The oxidation catalyst complex disclosed for the polycondensation is a combination of an amine and a copper salt.

The primary, secondary or tertiary amine in the catalyst complex is one of those disclosed in the above-mentioned Hay patents. Typical representatives are aliphatic amines in which the aliphatic group is straight-chain, branched or cyclic. Aliphatic monoamines are preferred. Mono-, di- and trialkylamines are particularly preferred, with the alkyl groups having from 1 to 12 carbon atoms. It is typically possible to use mono-, di- and trimethyl-, -ethyl-, -n-propyl-, -i-propyl-, -n-butyl-amines, mono- and dicyclohexylamine, ethylmethylamine, morpholine, N-alkyl cycloaliphatic amines such as N-methylcyclohexylamine. It is additionally possible to use cyclic tertiary amines such as pyridine, alpha-collidine, gamma-picoline and the like.

Mixtures of such primary, secondary and tertiary amines can also be used if required. A particularly preferred monoalkylamine is n-butylamine; a particularly preferred dialkylamine is di-n-butylamine; and a particularly preferred trialkylamine is triethylamine. A preferred cyclic tertiary amine is pyridine. The concentration of the primary and secondary amine in the reaction mixture can vary within wide limits. However, it is preferably added in low concentrations. A preferred range is from about 2.0 to 25.0 moles per 100 moles of monohydric phenol. In the case of a tertiary amine the preferred range is considerably higher and is from about 500 to about 1500 moles per 100 moles of the monohydric phenol.

Typical examples of copper(I) and copper(II) salts which are suitable for the process are to be found in the abovementioned Hay patents. They comprise copper(I) chloride, bromide, sulfate, azide, tetramine-sulfate, acetate, butyrate and toluate, copper(II) chloride, bromide, sulfate, azide, tetraminesulfate, acetate, butyrate and toluate, and the like. Preferred copper(I) and copper(II) salts are the halides, alkanoates or sulfates, eg. copper(I) bromide and chloride, and copper(II) bromide, chloride, fluoride and acetate. With primary and secondary amines the concentration of the copper salts is preferably kept low and preferably varies from about 0.1 to 2.5 moles per 100 moles of monohydric phenol. With tertiary amines the copper salt is preferably used in an amount of from about 5 to about 15 moles per 100 moles of monohydric phenols The ratio between solvent and monomer is normally in the range from 1:1 to 20:1, ie. up to a maximum 20-fold excess of solvent. Suitable solvents are $C_7$-$C_{10}$-hydrocarbons such as ethylbezene, xylene, diethylbenzene or mixtures thereof, with ethylbenzene or toluene preferably being used. The ratio between solvent and monomeric phenol is preferably in the range from 1:1 to 10:1 by weight.

It is also possible for the reaction mixture to contain an activator such as a diarylguanidine or a diarylformamidine (see U.S. Pat. No. 3,544,515).

The polycondensation is carried out, in particular, at from 15 to 25° C. This entails the oxygen being passed into the solution of the monomer, and it is possible to meter in the oxidation catalyst and electrically conducting compound I in solution over the course of from 0.1 to 1.5 hours, preferably from 0.1 to 0.5 hours. In a particularly preferred embodiment of the process according to the invention, the catalyst and the electrically conducting compound I are initially introduced in solution, and the appropriate amount of monomer is metered in while the oxygen is passed in.

The maximum electrical resistance of the solution before and during the reaction is checked using, for example, measuring probes or other suitable measuring equipment. The process according to the invention results in a drastic reduction in the electrical resistance of the solution before the reaction, and it does not increase substantially during the reaction.

When the polycondensation has reached the desired yield, and the polymer has reached the desired molecular weight, the reaction solution contains from 1 to 30% by weight of polyphenylene ether, 0.005 to 1.5% by weight of metal ions and about 0.1 to 6.0% by weight of amine plus, where appropriate, small amounts of other materials. These reaction solutions are treated with complexing compounds, such as sodium salts of ethylenediaminetetraacetic acid, of nitrilotriacetic acid or of other such amino carboxylic acids, to remove the metal catalyst contained in the polymer. The way in which the complexing agent is added is not crucial. Thus, the complexing compounds can be added either as solids or in aqueous solution in the form of their alkali metal or alkaline earth metal salts. Addition can be all at once or in several portions, continuously or discontinuously, with or without additional water. The metal component can be removed in suitable apparatus, such as filter presses, decantation tanks, bowl centrifuges and the like.

The above methods for removing the catalyst normally result in the electrically conducting compound I also being removed, and the polyphenylene ether prepared by the process according to the invention then contains negligible amounts of metal cations.

The contact time for the complexing agent with the polyphenylene ether phase can vary within wide limits. Reaction times of from 1 minute to 5 hours are preferred. Reaction times of from 5 to 30 minutes frequently suffice. The reaction is preferably carried out at from 25 to 80° C., but temperatures below and above this range can also be used.

In order to remove the metal catalysts completely from the polyphenylene ether it is possible to add the complexing compound and subsequently remove the resulting metal complexes as described above several times. However, a preferred embodiment of the invention entails the total amount of catalyst and antistatic being removed from the polymer in one complexation and separation step.

After the removal of the metallic components as complex, the polyphenylene ether can be isolated from the solution by the processes described in the initially mentioned US Patents. The isolation of the polyphenylene ether is not critical for the present invention. Thus, for example, the polyphenylene ether can be isolated by precipitation from a reaction solution using a nonsolvent such as an excess of an alcohol, eg. methanol. The filtered product can be suspended in alcohol and, if desired, stirred with a decolorizing agent and then filtered off and subsequently converted by conventional processes into films, fibers or shaped articles Other alcohols such as isopropanol, propanol or ethanol can also be used.

The amine component of the catalyst can be recovered by distillation or other conventional processes.

The polyphenylene ethers prepared by the process according to the invention can be used for all the purposes specified in the abovementioned Hay patents. For example, they can be used for shaped articles, films, tapes and the like. They can be mixed with other resins or various types of fillers, reinforcers, dyes, pigments, stabilizers, plasticizers and the like.

EXAMPLES 780 kg (8465 mol) of toluene and the oxidation catalyst I or II plus the electrically conducting compound in the form of a stabilized solution in paraffin were introduced into a 1200 l agitator tank.

Over the course of 8 hours, while passing oxygen through, 154.4 kg (1236 mol) of 2,6-dimethylphenol were introduced dropwise at a rate of 19.3 kg/h while the solution was vigorously mixed.

The temperature was 25° C and the oxygen input was 2 m³/h for 9 hours. After the polycondensation was complete the mixture was extracted twice with 72 kg (22 mol) of a 10 % strength aqueous solution of ethylenediaminetetraacetic acid disodium salt and 32 kg of water at 70–80° C., the aqueous phase was removed at 70–80° C., and the solvent was removed by evaporation.

Catalyst I 43.35 kg (470 mol) toluene
52.20 kg (404 mol) di-n-butylamine
0.95 kg (6.6 mol) copper(I) bromide

Catalyst II 43.35 kg (470 mol) toluene
52.20 kg (404 mol) di-n-butylamine
0.60 kg (3.3 mol) N,N-di-tert-butylethylenediamine
0.95 kg (6.6 mol) copper(I) bromide The electrically conducting compounds used were calcium di(oleoylanthranilate) and chromium(III) tris-(oleoyl-N-methylglycinate) in equimolar amounts in 33% by weight paraffin solution which additionally contained 33% by weight di-tert-butylphenol. The data in % by weight in the table refer to the total amounts of the abovementioned salts employed as a percentage of the total weight of the reaction mixture.

The electrical resistance of the reaction solution was determined by the DIN 51 412 method before the polycondensation and at 10 min intervals during it.

The figure given in the table is the maximum measured resistance of the reaction solution.

The chromium contents in the polyphenylene ethers prepared by the process according to the invention were determined by atomic absorption spectroscopy.

TABLE

| Example | Catalyst | Total solution of the salts [g] | Salt content [% by weight] | Electrical resistance [Mega Ω] at start | Cr content [ppm] |
|---|---|---|---|---|---|
| 1* | I | — | — | 1400 | — |
| 2* | II | — | — | 600 | — |
| 3 | II | 10.4 | 3.4 × 10⁻⁴ | 250 | <1 |
| 4 | II | 103 | 3.3 × 10⁻⁴ | 140 | <1 |
| 5 | II | 155 | 5.0 × 10⁻³ | 100 | <1 |
| 6 | II | 206 | 6.7 × 10⁻³ | 80 | <1 |

*for comparison

We claim:

1. A process for preparing a polyphenylene ether from monohydric phenols which has alkyl substituents in both ortho positions and optionally also in one meta position but not in the para position, by oxidative coupling with oxygen-containing gases in the presence of a combination of an amine and a copper salt as an oxidation catalyst and of an electrically conducting compound which counteracts the electrostatic charge in the reaction mixture, in organic solution, which comprises using as electrically conducting compound a salt of a carboxamide derivative of the formula I

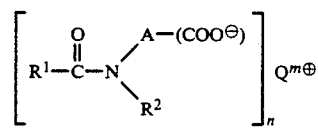

or mixtures of such salts, where
  $R^1$ is a saturated or singly or multiply unsaturated aliphatic group which can have a terminal phenol group and which contains a total of 8–30 carbon atoms, it also being possible for those carbon atoms to be interrupted by isolated oxygen atoms,
  $R^2$ is hydrogen or $C_1$–$C_4$-alkyl,
  A is an aliphatic, araliphatic or cycloaliphatic or aromatic bridge of up to 10 carbon atoms, n and m are each 1 to 3,
  $Q^\oplus$ is ammonium, an alkali metal cation or the valence equivalent of an alkaline earth metal cation or a cation of a metal of groups IVb to VIIb of the periodic table.

2. A process as claimed in claim 1, wherein $R^2$ is hydrogen or methyl.

3. A process as claimed in claim 1, wherein $R^1$ is $C_{12}$–$C_{20}$-alkyl.

4. A process as claimed in claim 1, wherein Q is sodium or calcium or chromium (III).

5. A process as claimed in claim 1, wherein the electrically conducting compound is calcium di(oleoylanthranilate).

6. A process as claimed in claim 1, wherein the electrically conducting compound is chromium(III) tris-(oleoyl-N-methylglycinate) or sodium oleoyl-N-methylglycinate.

7. A process as claimed in claim 1, wherein the electrically conducting compound is present in amounts of from $1 \cdot 10^{-4}$ to 0.1% of the total weight of the reaction mixture.

* * * * *